(12) United States Patent
Chai

(10) Patent No.: US 7,423,555 B2
(45) Date of Patent: Sep. 9, 2008

(54) HUMAN-MACHINE INTERFACE APPARATUS WITH EXPANDED FUNCTION

(75) Inventor: Li-Wen Chai, Taoyuan Hsien (TW)

(73) Assignee: Delta Electronics, Inc., Taoyuan Hsien (TW)

(*) Notice: Subject to any disclaimer, the term of this patent is extended or adjusted under 35 U.S.C. 154(b) by 373 days.

(21) Appl. No.: 11/178,347

(22) Filed: Jul. 12, 2005

(65) Prior Publication Data

US 2007/0013543 A1 Jan. 18, 2007

(51) Int. Cl.
*H03M 11/00* (2006.01)

(52) U.S. Cl. .................... 341/22; 345/168; 361/142; 361/166; 361/600; 361/627; 361/680; 341/20

(58) Field of Classification Search .................. 341/10, 341/11; 345/168; 414/788; 361/142, 166, 361/600, 627, 628, 630, 680
See application file for complete search history.

(56) References Cited

U.S. PATENT DOCUMENTS

| | | | | |
|---|---|---|---|---|
| 3,971,925 | A * | 7/1976 | Wenninger et al. | 708/130 |
| 4,768,412 | A * | 9/1988 | Sanderson | 84/645 |
| 5,144,302 | A * | 9/1992 | Carter et al. | 341/20 |
| 5,868,546 | A * | 2/1999 | Hahne et al. | 414/788 |
| 6,104,604 | A * | 8/2000 | Anderson et al. | 361/680 |
| 6,128,117 | A * | 10/2000 | Kim | 398/115 |
| 7,209,123 | B2 * | 4/2007 | Andres et al. | 345/168 |

* cited by examiner

*Primary Examiner*—Albert K Wong

(57) ABSTRACT

A human machine interface with expanded function includes a panel and a printed circuit board. A first key apparatus electrically coupled to the printed circuit board is mounted on the panel. The printed circuit board provides an expansion interface for optionally connecting a second key unit, so that a user can design and install the second key unit according to distinct requirements.

5 Claims, 4 Drawing Sheets

HUMAN-MACHINE INTERFACE APPARATUS WITH EXPANDED FUNCTION

BACKGROUND OF THE INVENTION

1. Field of the Invention

The present invention relates to a human-machine interface apparatus with expanded function, especially to a human-machine interface apparatus using an expansion interface and at least one external key unit to expand the input function thereof.

2. Description of Related Art

Human-machine interface devices are omnipresent in modern world as the progress and prevailing of electronic technology. For example, people often use human-machine interface devices for ATM, parking lot and factory to facilitate the transaction, payment and machine operation. The human-machine interface device generally comprises input interfaces and output interfaces. The input interface can be simply implemented with a plurality of keys, a keyboard or other kinds of input units such as a touch pad. The output interface can be simply implemented with a plurality of indication lamps, or seven-segments display or a complicated LCD for text and graphic display.

The human-machine interface devices for industrial applications can be roughly classified into two types, namely, keyboard type and touch pad type. The touch-pad-type human-machine interface devices have the advantages of flexible definition of input function. The input function can be re-defined by changing the displayed graphic icon. However, the touch-pad-type human-machine interface devices have higher cost. The keyboard-type human-machine interface devices (or referred to as non touch-pad-type human-machine interface devices) generally comprises a plurality of function keys and numeral keys for input function, and further comprises a relatively smaller LCD screen for display. The non touch-pad-type human-machine interface devices have the advantage of low cost, however, the key input function thereof is difficult to redefine on key per se. The key input function thereof may be redefined by change the displayed icon on screen. However, the non touch-pad-type human-machine interface device generally has relatively smaller LCD screen, it is inconvenient for user.

FIG. 1A shows a conventional non touch-pad-type human-machine interface device 10, which comprises a relatively smaller LCD screen 100, a function key set 110 (such as F1, F2 function key etc.) and a direction key set 120 (such as Upper, Down, Right and Left direction keys). The legend of the key is difficult to amend even thought the function thereof is redefined. It is also inconvenient for user because the keys are usually small and hard to operate. FIG. 1B shows another conventional non touch-pad-type human-machine interface device 20, which comprises an LCD screen 200, a function key set 210 (such as F1, F2 function key etc.), a direction key set 220 (such as Upper, Down, Right and Left direction keys) and a keypad 230 for inputting numeral digits. This non touch-pad-type human-machine interface device 20 has larger size than that shown in FIG. 1A. Moreover, the legend of the key may be amended by replacing a nameplate (not shown) associated with the key. Therefore the legend of the key can be changed to other command such as Run, or Stop, Forward, Backward after the key function is redefined. However, the nameplate is tended to degrade by moisture and the provision of new nameplate will increase cost.

SUMMARY OF THE INVENTION

The present invention is intended to overcome the problem of conventional human-machine interface devices by providing additional interface and key unit. The additional key unit has more eye-catching legend and can be easily amended when the function thereof is changed. Therefore, the input function of the human-machine interface device can be easily identified or changed, without being limited by original key unit.

Accordingly, the present invention provides a human-machine interface apparatus for inputting information to an automation device. The human-machine interface apparatus comprises a panel and a printed circuit board (PCB). The panel comprises a first key unit arranged thereon for a user to input instruction and electrically connected to the PCB. The PCB comprises an expansion interface arranged thereon and selectively connected to a second key unit, whereby user can redefine the function of the second key unit and can easily replace the second key unit.

BRIEF DESCRIPTION OF DRAWING

The features of the invention believed to be novel are set forth with particularity in the appended claims. The invention itself however may be best understood by reference to the following detailed description of the invention, which describes certain exemplary embodiments of the invention, taken in conjunction with the accompanying drawings in which:

DETAILED DESCRIPTION OF THE INVENTION

Figure 1A:
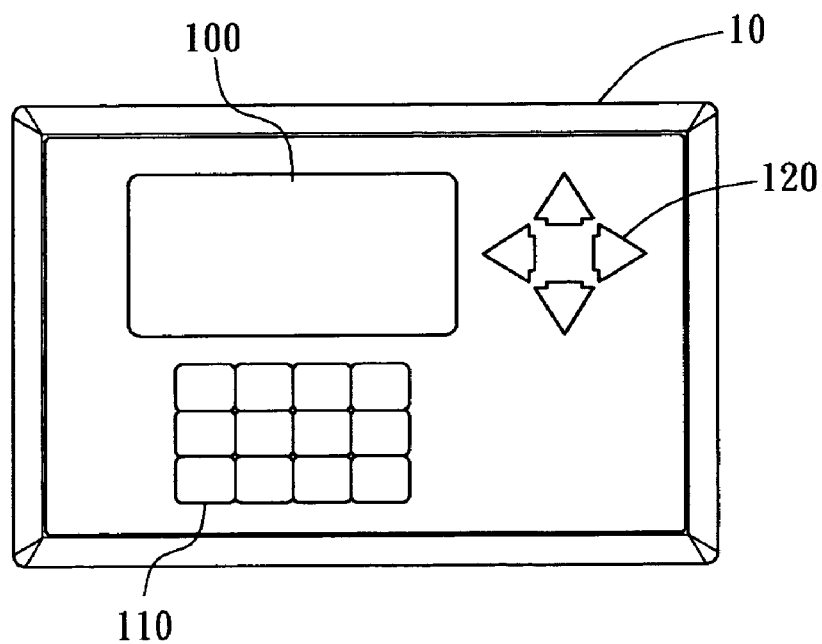
FIG. 1A shows a conventional non touch-pad-type human-machine interface device.
Figure 1B:
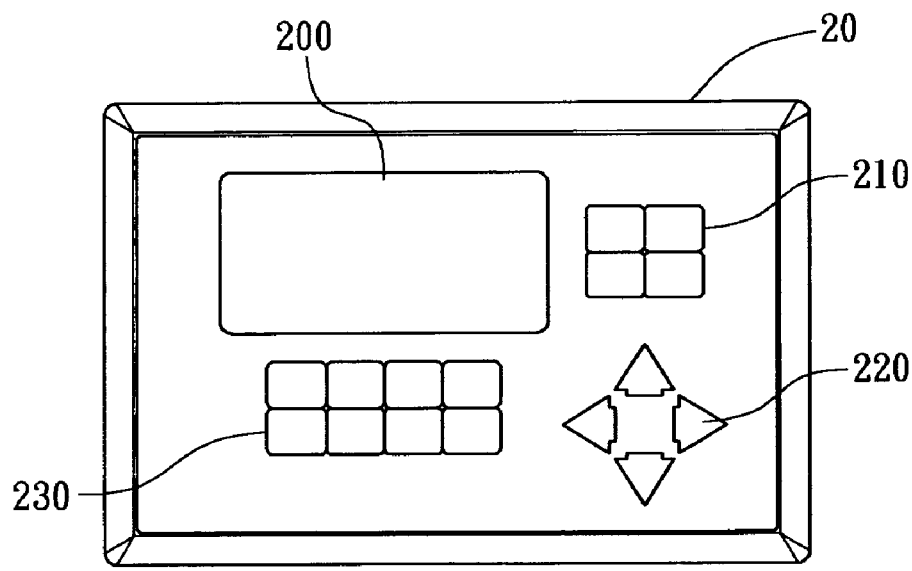
FIG. 1B shows another conventional non touch-pad-type human-machine interface device.
Figure 2A:
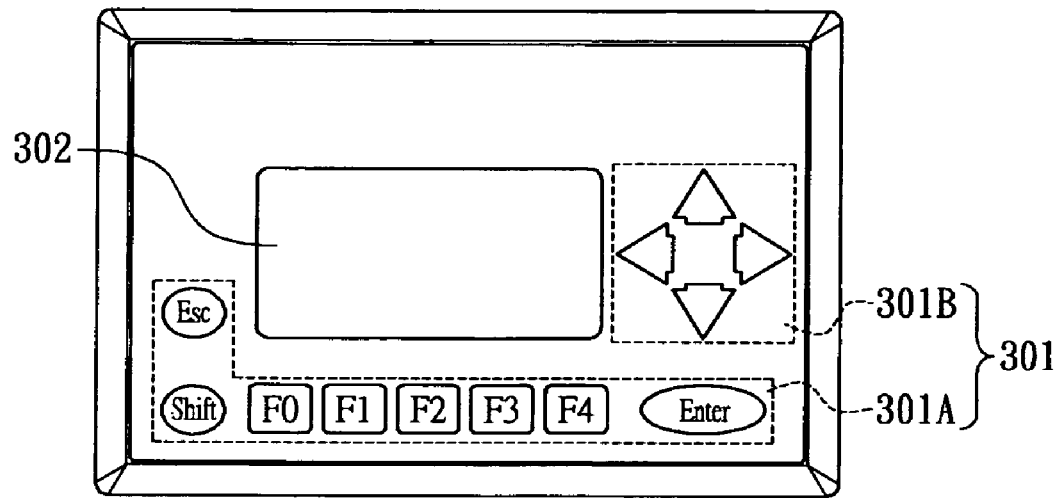
FIG. 2A shows a top view of the human-machine interface apparatus according to the present invention.
Figure 2B:
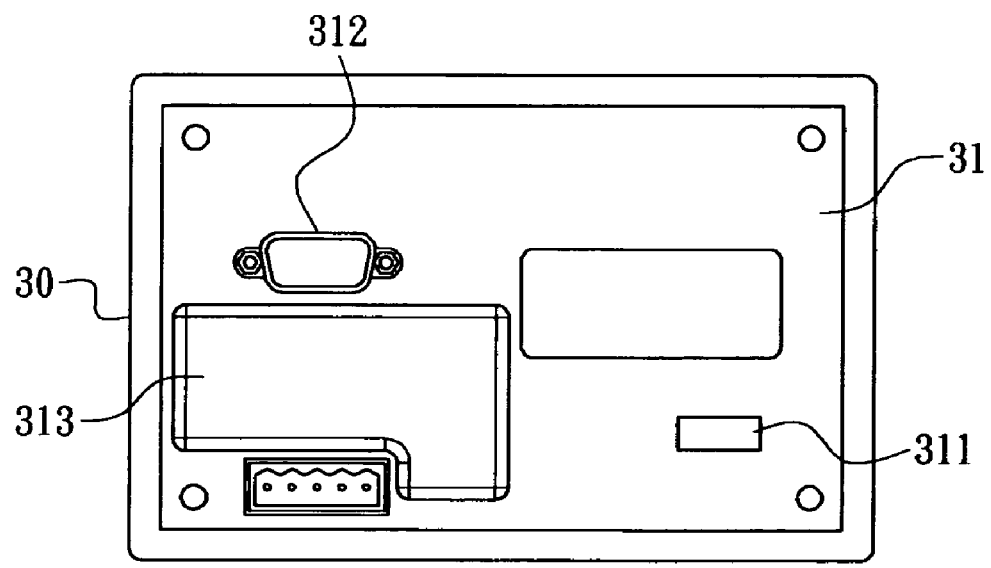
FIG. 2B shows a bottom view of the human-machine interface apparatus according to the present invention.

With reference to FIGS. 2A and 2B, the human-machine interface apparatus 3 according to the present invention mainly comprises a panel 30 and a printed circuit board (PCB) 31 arranged on a back side of the panel 30. The panel 30 comprises a first key unit 301 electrically connected to the PCB 31 and preferably comprises a function key set 301A (such as F1, F2 function key etc.) and/or a direction key set 301B (such as Upper, Down, Right and Left direction keys). The panel 30 further preferably comprises an LCD screen 302 electrically connected to the PCB 31 and is used for display information sent form the PCB 31. The PCB 31 comprises an expansion interface 311 and comprises further preferably at least one output interface such as RS-232 interface 312, and RS-485 interface 313 for connecting to other control device and automation device.

Figure 3:
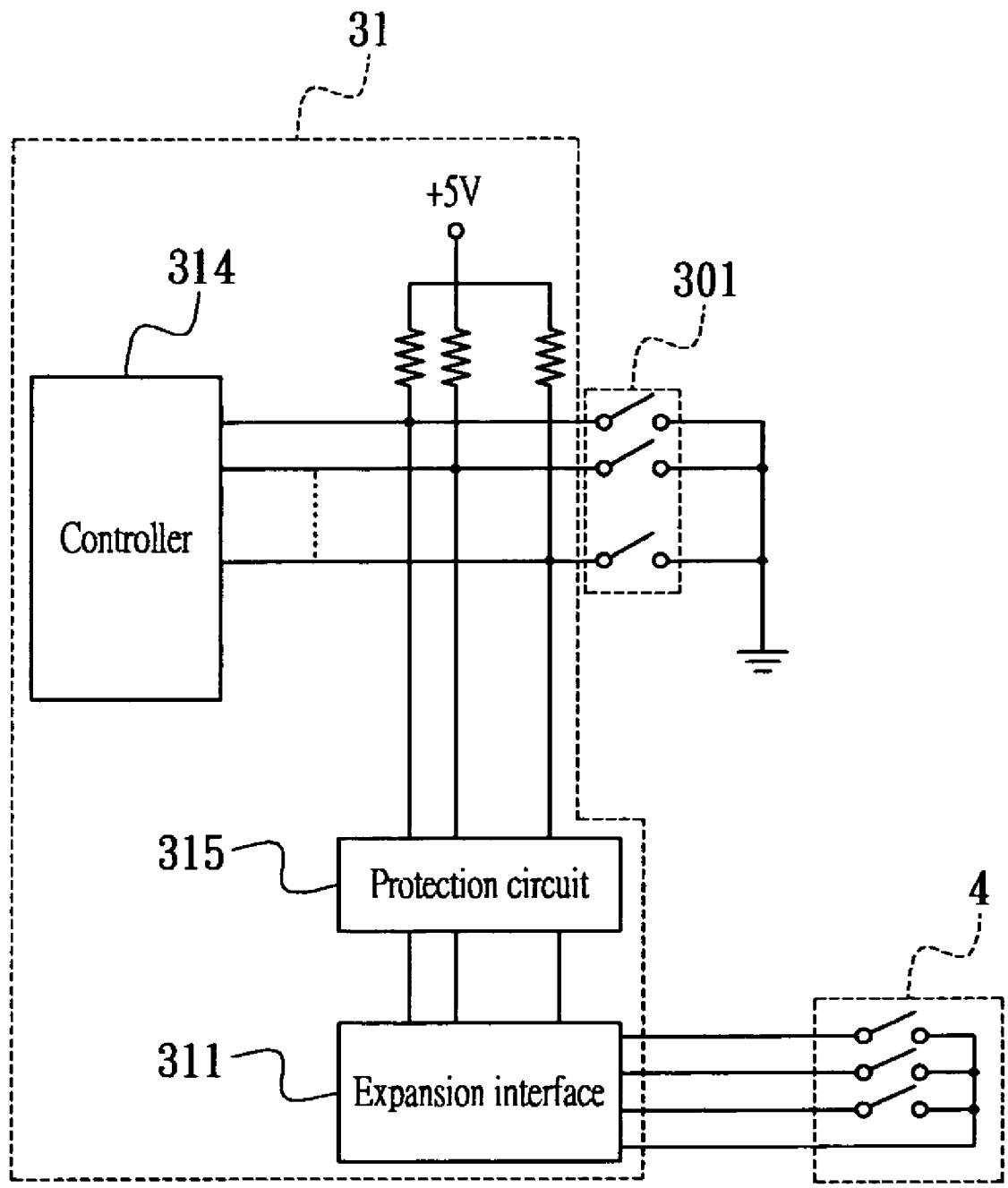
FIG. 3 shows a circuit diagram of the PCB according to a preferred embodiment of the present invention.
Figure 4:
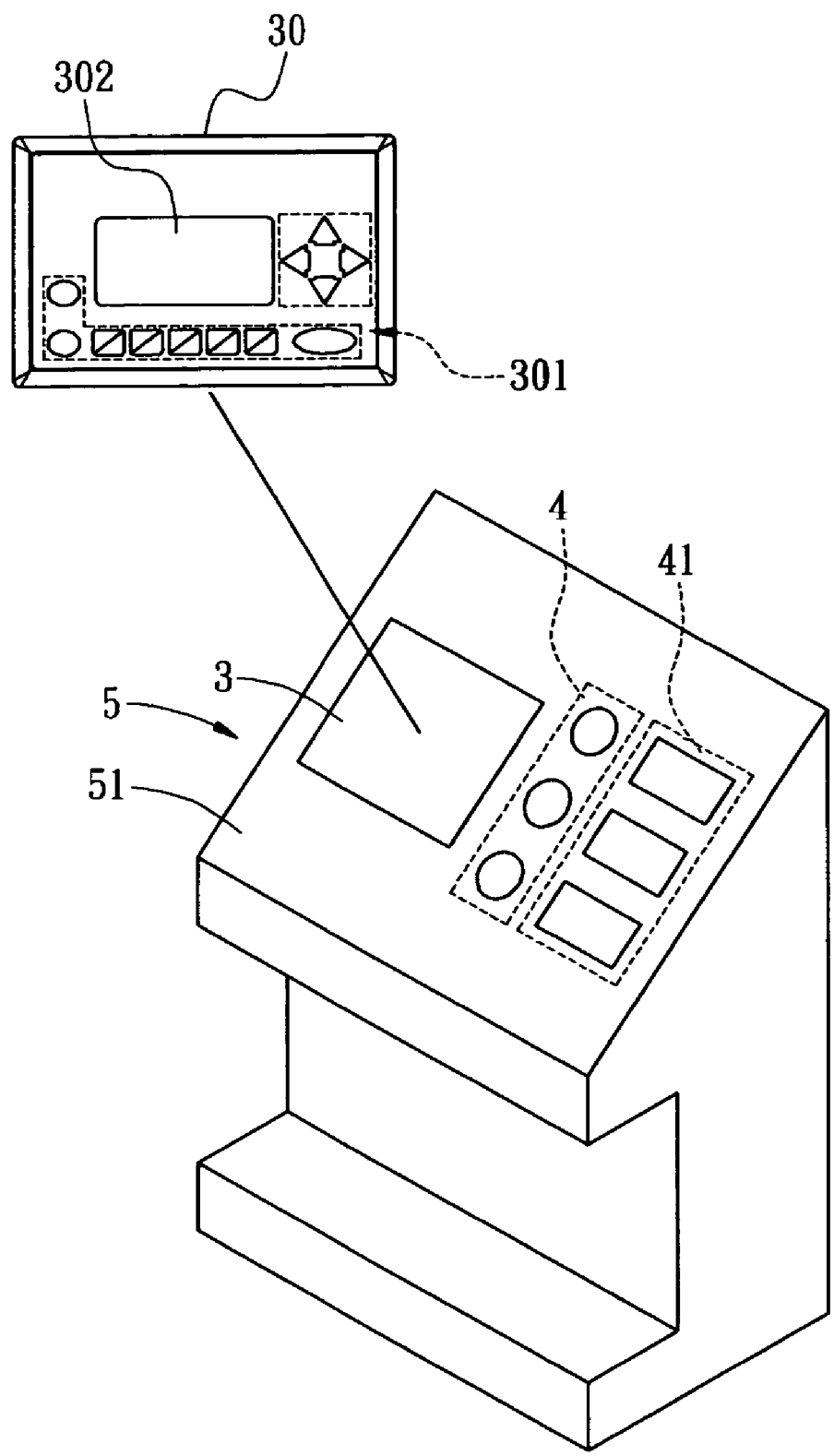
FIG. 4 shows an application of the human-machine interface apparatus according to a preferred embodiment of the present invention.

FIG. 3 shows a circuit diagram of the PCB 31 according to a preferred embodiment of the present invention. The PCB 31 comprises a controller 314, a protection circuit 315 and the expansion interface 311. With reference also to FIG. 2B, the first key unit 301 on the panel 30 is electrically connected to the controller 314. The expansion interface 311 is connected to the controller 314 through the protection circuit 315. Moreover, the expansion interface 311 and the protection circuit 315 are parallel to the first key unit 301, whereby a second key unit 4 (as shown in FIG. 4) can be connected to the expansion interface 311 for providing additional input function. The second key unit 4 has user-selected arrangement and shape, and can be placed at remote site for the operation of user. Therefore, the second key unit 4 can be marked with eye-catching legend or amended legend to overcome the limitation of the first key unit 301.

The second key unit 4 is preferably set by the controller 314 to perform user-defined function. For example a single key in the second key unit 4 can be programmed to perform a hot key function to execute a series of actions by one keystroke. Therefore, the second key unit 4 can replace all input functions of the first key unit 301 or provided updated function not supported by the first key unit 301. The second key unit 4 can provided a remote and enhanced input unit for the human-machine interface apparatus 3.

The protection circuit 315 protects the second key unit 4 from surge current to ensure stability of the second key unit 4. The protection circuit 315 can be implemented by any one of relay, fuse or surge protector.

FIG. 4 shows an application of the human-machine interface apparatus 3 according to a preferred embodiment of the present invention. The human-machine interface apparatus 3 according to the present invention is mounted on a control pane 51 of a console machine 5. The panel 30 of the human-machine interface apparatus 3 is a part of the control pane 51 of the console machine 5. The second key unit 4 is mounted on the control pane 51 of the console machine 5 and electrically connected to the expansion interface 311. As shown in this figure, a nameplate 41 with eye-catching legend can be optionally arranged beside the second key unit 4 to facilitate the operation of user.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

What is claimed is:

1. A human-machine interface apparatus for inputting information to an automation device, comprising:
    a panel device replaceably mounted on a control panel of the automation device, the panel device including;
    a first key unit arranged on a front surface of the panel device for a user to input instruction;
    a printed circuit board (PCB) arranged on a back side of the panel device, including:
       an expansion interface;
       an output interface for connecting to the automation device; and
       a controller electrically connected to the first key unit and the expansion interface;
    a LCD screen arranged on the front surface of the pane device, and electrically connected to the PCB for displaying information sent from the PCB;
    a second key unit fixedly arranged on the automation device and electrically connected to the expansion interface for providing additional input function; and
    a nameplate arranged beside the second key unit,
    wherein the controller receives input from the first key unit as well as controls the expansion interface to receive input from the second key unit, and the input from the second key unit performs all input functions of the first key unit, and
    wherein functions of the second key unit are shown by the nameplate.

2. The human-machine interface apparatus as in claim 1, further comprising a protection circuit electrically connected to the expansion interface, the controller and the first key unit.

3. The human-machine interface apparatus as in claim 2, wherein the protection circuit is a relay.

4. The human-machine interface apparatus as in claim 2, wherein the protection circuit is a fuse.

5. The human-machine interface apparatus as in claim 2, wherein the protection circuit is a surge protector.

* * * * *